(12) United States Patent
Koch et al.

(10) Patent No.: US 7,717,438 B2
(45) Date of Patent: May 18, 2010

(54) CHASSIS SYSTEM FOR A MOTOR VEHICLE AND METHOD FOR DRIVING DYNAMICS REGULATION

(75) Inventors: Thorsten Koch, Schwieberdingen (DE); Thomas Hunn, Renningen (DE)

(73) Assignee: Dr. Ing. h.c. F. Porsche Akteingesellschaft, Weissach (DE)

( * ) Notice: Subject to any disclaimer, the term of this patent is extended or adjusted under 35 U.S.C. 154(b) by 0 days.

(21) Appl. No.: 12/169,015

(22) Filed: Jul. 8, 2008

(65) Prior Publication Data

US 2009/0026719 A1    Jan. 29, 2009

(30) Foreign Application Priority Data

Jul. 26, 2007    (DE) ........................ 10 2007 034 840

(51) Int. Cl.
*B60G 17/015*    (2006.01)

(52) U.S. Cl. ................ 280/5.508; 280/5.52; 280/86.75; 280/86.751; 280/124.103; 280/124.106

(58) Field of Classification Search .............. 280/5.508, 280/5.507, 5.52, 86.75, 86.751, 124.103, 280/124.106, 124.137, 124.149, 124.152
See application file for complete search history.

(56) References Cited

U.S. PATENT DOCUMENTS

| | | | | |
|---|---|---|---|---|
| 4,573,702 A | * | 3/1986 | Klem ........................ | 280/5.504 |
| 4,700,972 A | | 10/1987 | Young | |
| 4,716,982 A | * | 1/1988 | Ishii et al. .................... | 180/415 |
| 5,080,389 A | * | 1/1992 | Kawano et al. ........ | 280/124.142 |
| 5,292,149 A | * | 3/1994 | Luger ....................... | 280/5.521 |
| 5,700,025 A | * | 12/1997 | Lee ......................... | 280/86.751 |
| 6,182,979 B1 | * | 2/2001 | Lee .......................... | 280/5.507 |
| 6,267,387 B1 | * | 7/2001 | Weiss ........................ | 280/5.52 |
| 6,293,561 B1 | * | 9/2001 | Goetzen et al. ............ | 280/5.52 |
| 6,302,417 B1 | | 10/2001 | Heyring | |
| 6,347,802 B1 | * | 2/2002 | Mackle et al. ........... | 280/5.521 |
| 6,386,553 B2 | * | 5/2002 | Zetterstrom ................ | 280/5.51 |
| 6,851,679 B2 | * | 2/2005 | Downey et al. .......... | 280/5.511 |
| 7,287,621 B2 | * | 10/2007 | Kuroki et al. ............... | 180/374 |
| 2007/0198151 A1 | | 8/2007 | Munster | |

FOREIGN PATENT DOCUMENTS

| | | |
|---|---|---|
| DE | 19637159 A1 | 3/1998 |
| DE | 102004008802 A1 | 9/2005 |
| DE | 102004014576 A1 | 10/2005 |
| EP | 0378028 A1 | 7/1990 |
| EP | 1754649 A1 | 2/2007 |
| WO | 9954186 A1 | 10/1999 |

OTHER PUBLICATIONS

European search report dated May 28, 2009.

* cited by examiner

*Primary Examiner*—Toan C To

(57) ABSTRACT

A chassis system for a motor vehicle has a device for roll stabilization and a device for wheel camber adjustment. The device for roll stabilization and the device for wheel camber adjustment have one or more hydraulic actuating devices. The device for roll stabilization and the device for wheel camber adjustment are coupled to one another by a common hydraulic system. Accordingly, a link is provided between the roll stabilization arrangement and the camber adjustment arrangement in the motor vehicle. An active camber adjustment arrangement is realized by using the hydraulic power supply and the valves of the roll stabilization arrangement.

7 Claims, 1 Drawing Sheet

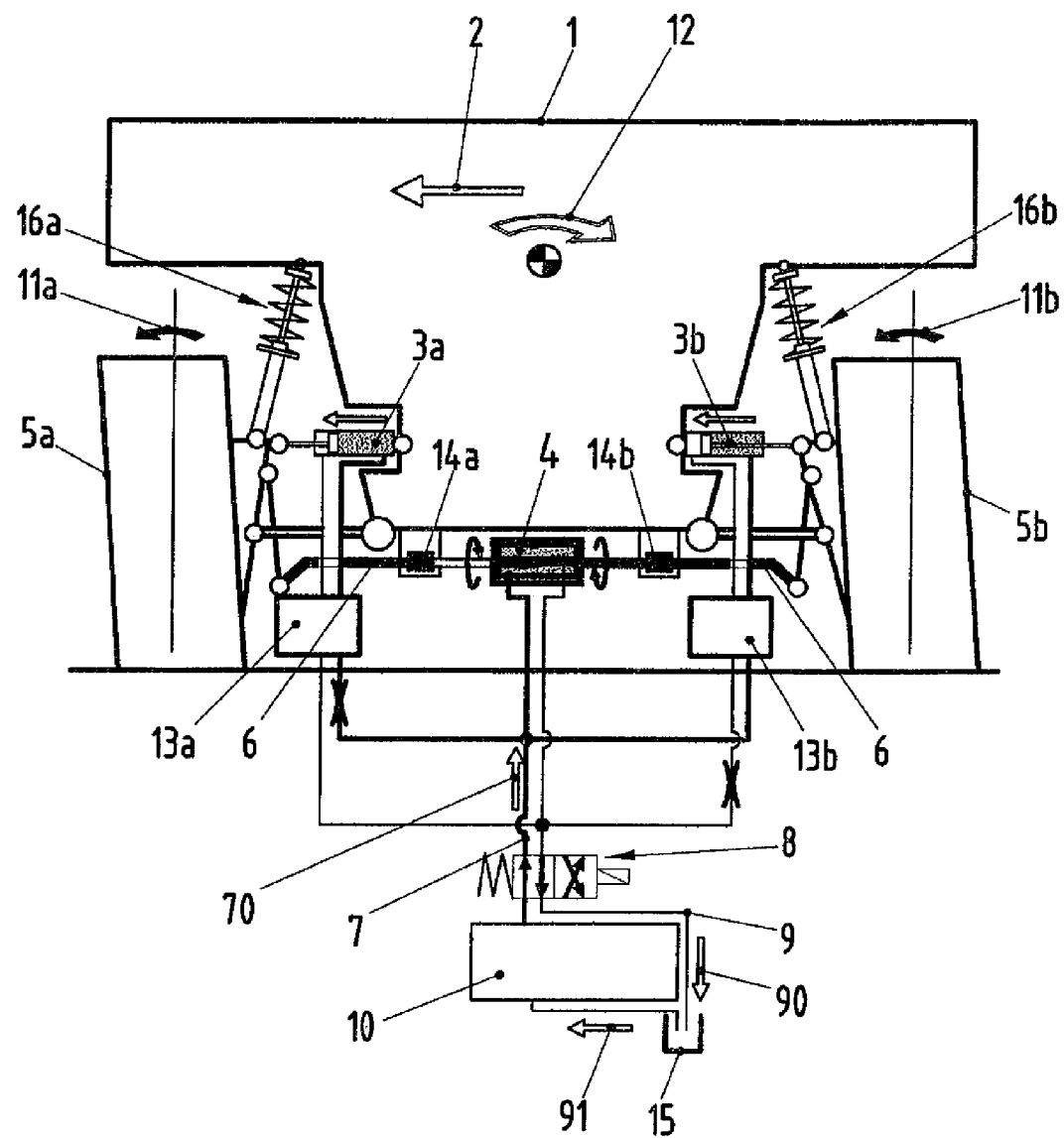

US 7,717,438 B2

CHASSIS SYSTEM FOR A MOTOR VEHICLE AND METHOD FOR DRIVING DYNAMICS REGULATION

CROSS-REFERENCE TO RELATED APPLICATION

This application claims the priority, under 35 U.S.C. §119, of German application DE 10 2007 034 840.3, filed Jul. 26, 2007; the prior application is herewith incorporated by reference in its entirety.

BACKGROUND OF THE INVENTION

Field of the Invention

The invention relates to a chassis system for a motor vehicle having a device for roll stabilization and a device for wheel camber adjustment. The invention also relates to a method for driving dynamics regulation of a motor vehicle using a corresponding chassis system.

Published, European patent application EP 1 754 649 A1 discloses a device for adjusting the wheel camber of a vehicle axle of a motor vehicle, wherein at least two chassis links which are provided for the articulated connection of the wheels are provided, on which chassis links an actuator engages in order to vary the position of the chassis links. A longitudinally adjustable actuator axle of the actuator engages at one side on the one chassis link and at the other side on the other chassis link, wherein the actuator contains an electric motor and a ball screw drive in addition to the actuator axle.

Published, German patent application DE 10 2004 014 576 A1, corresponding to U.S. patent publication No. 2007/0198151, proposes a method for driving stability regulation of a vehicle, in which a rear wheel camber angle of the wheels of the rear axle is actively set in dependence on a driving state, and a front anti-roll moment is imparted to the front axle and a rear anti-roll moment is imparted to the rear axle, wherein a roll moment distribution which represents the ratio of the rear anti-roll moment to the front anti-roll moment is set in dependence on the rear wheel camber angle of the wheels of the rear axle.

SUMMARY OF THE INVENTION

It is accordingly an object of the invention to provide a chassis system for a motor vehicle and a method for driving dynamics regulation, that overcome the above-mentioned disadvantages of the prior art devices and methods of this general type, which improve the driving dynamics and which can be realized in a compact configuration.

With the foregoing and other objects in view there is provided, in accordance with the invention, a chassis system for a motor vehicle. The chassis system contains a device for roll stabilization and a device for wheel camber adjustment. The device for roll stabilization and the device for wheel camber adjustment each have at least one hydraulic actuating device. A common hydraulic system couples the device for roll stabilization to the device for wheel camber adjustment.

In a chassis system of the type specified above, according to the invention, the device for roll stabilization and the device for wheel camber adjustment have one or more hydraulic actuating devices. The device for roll stabilization and the device for wheel camber adjustment are coupled to one another by a common hydraulic system. In the chassis system according to the invention, the roll stabilization arrangement and the wheel camber adjustment arrangement are integrated into one another. This considerably simplifies the regulation, relatively few valve components are required and a highly effective integrated system is provided.

The device for roll stabilization can advantageously have at least one hydraulic actuating device coupled to a stabilizer.

In one advantageous refinement, the hydraulic actuating device can be embodied as a pivoting actuating device for the stabilizer.

The device for wheel camber adjustment can advantageously have one hydraulic cylinder, which is embodied as a linear actuating device, per wheel.

The common hydraulic system can advantageously have a pressure supply device which is connected by lines to the one or more hydraulic actuating devices of the device for roll stabilization and of the device for wheel camber adjustment. At least one valve device is provided between the pressure supply device and the hydraulic actuating devices.

The pressure supply device can expediently be configured such that the nominal pressure in the hydraulic system is set in dependence on the vehicle states, wherein at least one of the following signals is used in order to determine the vehicle state: lateral acceleration, steering wheel angle, vehicle speed, and roll angle.

At least one device for adapting the hydraulic pressure and/or the hydraulic flow can advantageously be provided for the device for wheel camber adjustment, that is to say in particular for the hydraulic actuating devices of the device.

The chassis system can expediently be configured for one or more vehicle axles.

The object on which the invention is based is also achieved by a method for driving dynamics regulation of a motor vehicle using a chassis system according to the invention or one of its refinements for active roll stabilization and for active wheel camber adjustment in dependence on the vehicle state of the motor vehicle.

Other features which are considered as characteristic for the invention are set forth in the appended claims.

Although the invention is illustrated and described herein as embodied in a chassis system for a motor vehicle and a method for driving dynamics regulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION THE DRAWING

The single FIGURE of the drawing is a schematic illustration of a chassis system in the example of a vehicle axle according to the invention.

DETAILED DESCRIPTION OF THE INVENTION

Referring now to the single FIGURE of the drawing in detail, there is shown a schematic diagrammatic illustration of a vehicle body 1 and a chassis system, illustrated by way of example in connection with an axle of a motor vehicle. Two wheels 5a, 5b are assigned to a common axle of the motor vehicle and have in each case one wheel suspension 16a, 16b. Disposed between the wheels 5a, 5b is a stabilizer 6, preferably a cornering stabilizer. The stabilizer 6 can be coupled to the vehicle body 1 by stabilizer mounts 14a, 14b. For roll stabilization, a hydraulic actuating device 4 is arranged on the stabilizer 6, which hydraulic actuating device 4 is embodied in the example shown as a pivoting actuating device, for example as a rotary actuator, for the stabilizer 6. The hydraulic actuating device 4 can for example also be embodied as a linear actuator. For wheel camber adjustment, one hydraulic actuating device 3a, 3b is provided per wheel 5a, 5b in the example shown. In the example shown, the hydraulic actuating devices 3a, 3b for wheel camber adjustment are embodied as linear actuating devices in the form of hydraulic cylinders. It is also possible to provide pivoting actuators as hydraulic actuating devices 3a, 3b, which is however not illustrated in any more detail in the drawing. The pivoting actuators are preferably in each case coupled to the track rod by a lever. In the example shown, a vehicle state is indicated in which the motor vehicle is travelling around a corner, wherein arrow 2 specifies the direction toward the center of the corner. Accordingly, a rolling movement indicated by arrow 12 is generated on account of the cornering. The wheels 5a, 5b and the tires have a camber angle 11a, 11b.

The hydraulic actuating devices 4 and 3a, 3b which are shown, both of the device for roll stabilization and also of the device for wheel camber adjustment, have a common hydraulic system. The required hydraulic flow is provided by a pressure supply device 10, with the hydraulic flow and/or the hydraulic pressure being controlled and/or regulated preferably in dependence on the acting lateral forces. The pressure supply device 10 is coupled by lines 7, 9 to the hydraulic actuating devices 3a, 3b, 4. In the example shown, the line 7 of the hydraulic system is the inflow line. The return flow line is the line 9 in this example. Accordingly, for the vehicle state corresponding to the example shown, the hydraulic flow is indicated by the arrows 70, 90, 91.

The hydraulic system shown has a tank 15 for the hydraulic liquid. At least one valve device 8 is provided, which can for example have a directional valve, by which the correct piston surfaces can be loaded with pressure corresponding to the respective corner direction or the change thereof.

Without roll stabilization, the vehicle body 1 would, when travelling around a corner, perform a rolling movement in the direction of the arrow 12, that is to say would tilt, toward the outside of the corner. In order to reduce or prevent the rolling movement, the hydraulic actuating device 4 for roll stabilization generates a torsional moment in the stabilizer 6, which torsional moment stabilizes the vehicle body 1 by support forces in the stabilizer mounts 14a, 14b.

The active camber adjustment tilts the tires or wheels 5a, 5b into the corner, counter to the lateral force direction. This takes place with the aid of the actuating devices 3a, 3b. The actuating devices 3a, 3b are coupled to one another and are connected to the hydraulic inflow and outflow lines of the roll stabilization arrangement. Furthermore, it is also possible for at least one device 13a, 13b for adapting the hydraulic pressure and/or the hydraulic flow to be provided for the wheel camber adjustment arrangement. An adaptation hydraulic arrangement of this type can be used, according to the dimensioning of the actuating devices 3a, 3b, for wheel camber adjustment in order to reduce the pressure or the flow. It can be expedient to measure the camber and/or determine the camber by calculation. The wheel camber adjustment or the adaptation of the hydraulic pressure and/or of the hydraulic flow for wheel camber adjustment can take place as a function of the measured and/or determined camber. The active wheel camber adjustment brings about an optimization of the tire contact patch as a result of a tilting of the tire about its longitudinal axis. In this way, the deformation of the tire contact patch under the influence of the lateral force is counteracted by a tilting of the tire into the corner. The tire can in this way transmit greater lateral forces.

In the active camber adjustment arrangement according to the invention, the energy for the camber adjustment is provided by the same hydraulic supply which also provides energy for the roll stabilization arrangement. The roll stabilization arrangement serves to minimize the roll angle during cornering, with the hydraulic supply in connection with valves and at least one actuating device 4 on the stabilizer 6 imparting a stabilizing force to the body in dependence on vehicle states, for example a measured and/or calculated lateral acceleration.

The energy supply both to the active roll stabilization arrangement and also to the active wheel camber adjustment arrangement takes place hydraulically, with the nominal pressure being defined on the basis of vehicle states. A vehicle state can be determined by one or more of the following measured and/or calculated variables: lateral acceleration, steering wheel angle, vehicle speed, and roll angle. The pressure adjustment can take place for example by sensors for example for lateral acceleration, steering wheel angle, vehicle speed, pressure, hydraulic flow and/or travel(s) or position(s) of the actuating devices.

An essential concept for the invention is the linking of a roll stabilization arrangement with a camber adjustment arrangement in motor vehicles. An active camber adjustment arrangement is realized in which the hydraulic power supply and the valves of the roll stabilization arrangement are used. The hydraulic flow supplies both the actuators of the roll stabilization arrangement and also the actuators for the camber adjustment arrangement. The invention and the corresponding teaching can be used with a different number of actuating devices 3a, 3b, 4, with a different number of valve devices and with a different number of pressure supply devices 10.

The invention claimed is:

1. A chassis system for a motor vehicle, the chassis system comprising:
   a device for roll stabilization;
   a device for wheel camber adjustment, said device for roll stabilization and said device for wheel camber adjustment each have at least one hydraulic actuating device;
   a common hydraulic system coupling said device for roll stabilization to said device for wheel camber adjustment; and
   a stabilizer, said at least one hydraulic actuating device of said device for roll stabilization is coupled to said stabilizer.

2. The chassis system according to claim 1, wherein said hydraulic actuating device of said device for roll stabilization is a pivoting actuating device for said stabilizer.

3. The chassis system according to claim 1, wherein said at least one hydraulic actuating device for said device for wheel camber adjustment has one hydraulic cylinder per wheel and is a linear actuating device.

4. The chassis system according to claim 1,
   wherein said common hydraulic system has a pressure supply device and lines connected to said at least one hydraulic actuating device of said device for roll stabilization and of said device for wheel camber adjustment; and
   further comprising at least one valve device disposed between said pressure supply device and said at least one hydraulic actuating device.

5. The chassis system according to claim 4, wherein said pressure supply device is configured such that a nominal pressure in said common hydraulic system is set in dependence on a vehicle state, wherein at least one signal is used to determine the vehicle state selected from the group consisting of lateral acceleration, steering wheel angle, vehicle speed, and roll angle.

6. The chassis system according to claim 1, further comprising at least one device for adapting at least one of a hydraulic pressure and a hydraulic flow for said device for wheel camber adjustment.

7. The chassis system according to claim 1, wherein the chassis system is configured for at least one vehicle axle.

* * * * *